United States Patent
Richardson et al.

(10) Patent No.: US 10,047,780 B2
(45) Date of Patent: Aug. 14, 2018

(54) DIRECT TENSION INDICATING APPARATUS

(71) Applicant: Applied Bolting Technology, Bellows Falls, VT (US)

(72) Inventors: Jordan David Richardson, Walpole, NH (US); Robert David Westover, Walpole, NH (US)

(73) Assignee: APPLIED BOLTING TECHNOLOGY, Bellows Falls, VT (US)

( * ) Notice: Subject to any disclaimer, the term of this patent is extended or adjusted under 35 U.S.C. 154(b) by 0 days.

(21) Appl. No.: 15/157,764

(22) Filed: May 18, 2016

(65) Prior Publication Data

US 2017/0335878 A1 Nov. 23, 2017

(51) Int. Cl.
*F16B 31/02* (2006.01)

(52) U.S. Cl.
CPC ............ *F16B 31/028* (2013.01); *F16B 31/02* (2013.01)

(58) Field of Classification Search
CPC ....... F16B 1/0071; F16B 31/02; F16B 31/028
USPC .......................................... 411/8, 10, 11, 13
See application file for complete search history.

(56) References Cited

U.S. PATENT DOCUMENTS

| | | | |
|---|---|---|---|
| 3,469,492 A | 9/1969 | Dahl | |
| 4,020,734 A * | 5/1977 | Bell | F16B 31/028 411/10 |
| 4,138,922 A | 2/1979 | Richter et al. | |
| 5,015,132 A | 5/1991 | Turner et al. | |
| 5,370,483 A | 12/1994 | Hood et al. | |
| 5,628,599 A * | 5/1997 | Eakin | F16B 33/002 411/156 |
| 5,769,581 A * | 6/1998 | Wallace | F16B 31/028 116/212 |
| 5,931,618 A | 8/1999 | Wallace et al. | |
| 6,425,718 B1 * | 7/2002 | Herr | F16B 31/028 411/10 |
| 6,966,735 B1 * | 11/2005 | Yamazaki | F16B 39/24 411/131 |
| 8,016,531 B2 * | 9/2011 | White | F16B 39/10 301/105.1 |
| 8,382,409 B2 * | 2/2013 | Wallace | F16B 31/028 411/13 |
| 8,591,157 B1 * | 11/2013 | Stewart | F16B 31/02 411/10 |
| 8,622,671 B2 * | 1/2014 | Gagneur | F16B 39/108 403/315 |
| 8,696,275 B2 * | 4/2014 | Wallace | F16B 31/028 411/10 |
| 2013/0170924 A1 * | 7/2013 | Wallace | F16B 31/028 411/531 |

OTHER PUBLICATIONS

International Search Report and Written Opinion for application PCT/US2017/033018, dated Aug. 3, 2017, 11pgs.

* cited by examiner

*Primary Examiner* — Roberta S Delisle
(74) *Attorney, Agent, or Firm* — Cantor Colburn LLP

(57) ABSTRACT

A direct tension indicating washer apparatus includes a direct tension indicating washer; a base washer; and an anti-rotation feature to prevent rotation of the direct tension indicating washer relative to the base washer.

12 Claims, 6 Drawing Sheets

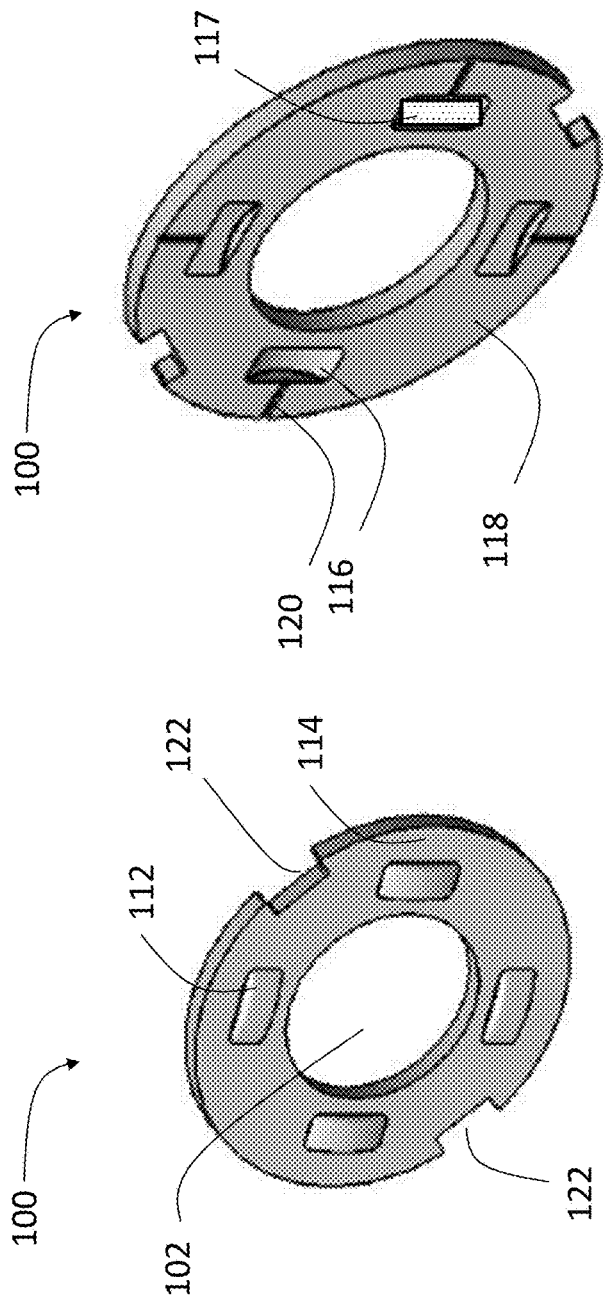

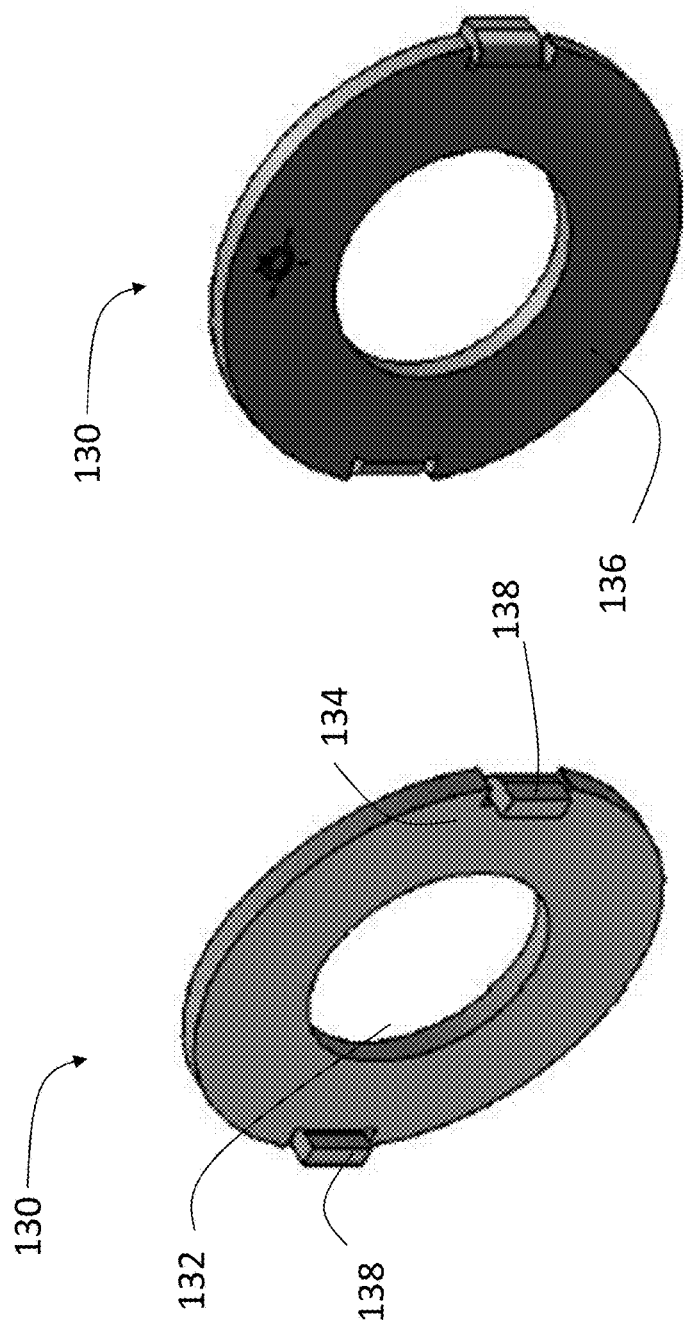

DIRECT TENSION INDICATING APPARATUS

BACKGROUND

Embodiments described herein relate generally to direct tension indicating apparatus, and more particularly, to a direct tension indicating apparatus including a direct tension indicating washer and a base washer.

Direct tension indicating washers are used to indicate when proper bolt tension has been reached. U.S. Pat. No. 5,931,618, the entire contents of which are incorporated herein by reference, discloses an exemplary direct tension indicating washer. FIG. 1 is a top view of the direct tension indicating washer from U.S. Pat. No. 5,931,618. FIG. 2 is a cross-sectional view taken along line 2-2 of FIG. 1. Direct tension indicating washer 60 includes protuberances 12 formed on a first surface 14 and corresponding indentations 16 formed on a second surface 18. The direct tension indicating washer 60 includes channels 62 in bottom surface 18 that lead from each indentation 16 to the outer diameter of the direct tension indicating washer 60. The indentation 16 is filled with an indicating material 64. When direct tension indicating washer 60 is used with a bolt, protuberances 12 are compressed as the bolt is tensioned. When the desired bolt tension is achieved, indicating material 64 emerges from channel 62 at the outer diameter of direct tension indicating washer 60. The emission of the indicating material provides a visual indicator that the bolt has been properly tensioned.

In some installation environments, the installation surface adjacent to the second surface 18 may be rough, worn, pocked, etc. For example, a mounting flange for joining two pipes may have an irregular surface due to the lack for any tolerance control on the surface and/or repeated assembly/disassembly of the pipes. When the direct tension indicating washer 60 is used on such a surface, the indicating material may become smudged or smeared, rather than emit cleanly from the outer diameter of the direct tension indicating washer 60.

BRIEF DESCRIPTION

According to one embodiment, a direct tension indicating washer apparatus includes a direct tension indicating washer; a base washer; and an anti-rotation feature to prevent rotation of the direct tension indicating washer relative to the base washer.

In addition to one or more of the features described above, or as an alternative, further embodiments may include wherein the anti-rotation feature comprises a tab on one of the direct tension indicating washer and the base washer and a notch on the other of the direct tension indicating washer and the base washer, the tab received in the notch to prevent rotation of the direct tension indicating washer relative to the base washer.

In addition to one or more of the features described above, or as an alternative, further embodiments may include wherein the anti-rotation feature comprises two tabs on one of the direct tension indicating washer and the base washer and two notches on the other of the direct tension indicating washer and the base washer, the tabs received in the notches to prevent rotation of the direct tension indicating washer relative to the base washer.

In addition to one or more of the features described above, or as an alternative, further embodiments may include wherein the anti-rotation feature comprises a pin on one of the direct tension indicating washer and the base washer and an opening on the other of the direct tension indicating washer and the base washer, the pin received in the opening to prevent rotation of the direct tension indicating washer relative to the base washer.

In addition to one or more of the features described above, or as an alternative, further embodiments may include wherein the anti-rotation feature comprises two pins on one of the direct tension indicating washer and the base washer and two openings on the other of the direct tension indicating washer and the base washer, the pins received in the openings to prevent rotation of the direct tension indicating washer relative to the base washer.

In addition to one or more of the features described above, or as an alternative, further embodiments may include wherein the direct tension indicating washer includes a first surface having a protuberance formed thereon; a second surface having an indentation formed opposite the protuberance; an indicating material positioned in the indentation; and a channel leading from the indentation to an outer diameter of the direct tension indicating washer.

In addition to one or more of the features described above, or as an alternative, further embodiments may include wherein the base washer is a second direct tension indicating washer.

In addition to one or more of the features described above, or as an alternative, further embodiments may include wherein the second direct tension indicating washer includes: a first surface having a protuberance formed thereon; a second surface having an indentation formed opposite the protuberance; an indicating material positioned in the indentation; and a channel leading from the indentation to an outer diameter of the direct tension indicating washer.

In addition to one or more of the features described above, or as an alternative, further embodiments may include wherein the second surface of the direct tension indicating washer is positioned adjacent to and facing the second surface of the second direct tension indicating washer.

In addition to one or more of the features described above, or as an alternative, further embodiments may include wherein the indentation of the direct tension indicating washer is aligned with the indentation of the second direct tension indicating washer.

In addition to one or more of the features described above, or as an alternative, further embodiments may include wherein the direct tension indicating washer is calibrated for a first bolt tension and the second direct tension indicating washer is calibrated for a second bolt tension.

In addition to one or more of the features described above, or as an alternative, further embodiments may include wherein the first bolt tension is different than the second bolt tension.

Technical effects of embodiments include the use of a base washer with a direct tension indicating washer to improve emission of indicating material.

BRIEF DESCRIPTION OF THE DRAWINGS

Referring now to the drawings wherein like elements are numbered alike in the several Figures:

FIGS. 3 and 4 are perspective views of a direct tension indicating washer in an embodiment;

FIGS. 5 and 6 are perspective views of a base washer in an embodiment;

DETAILED DESCRIPTION

Figure 1:
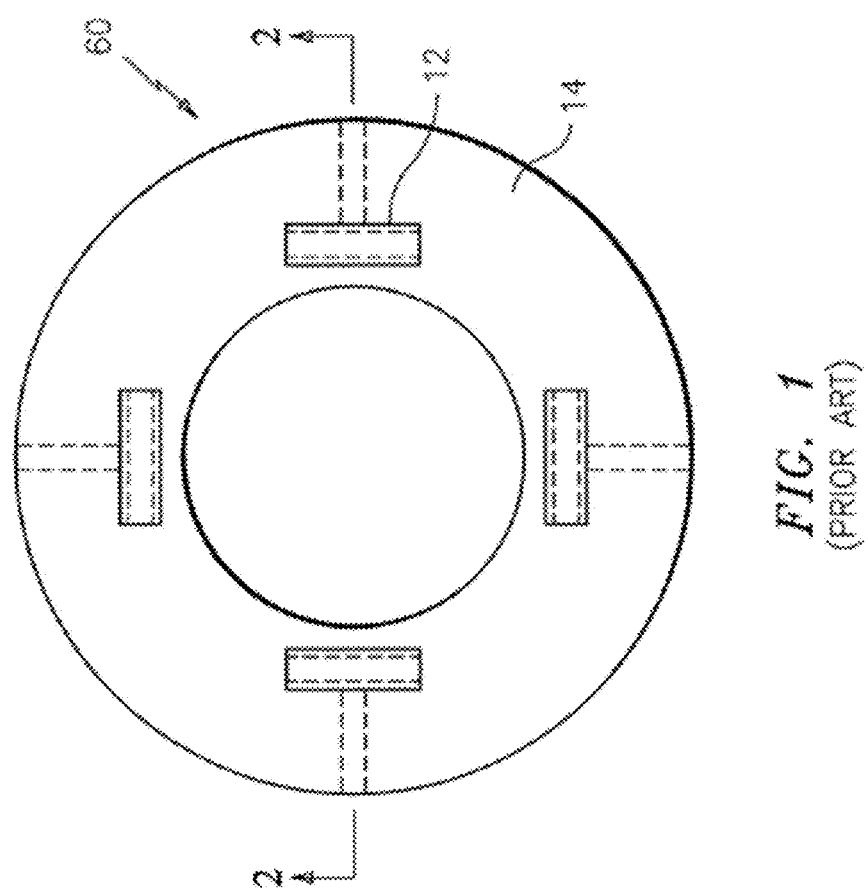
FIG. 1 is a top view of a conventional direct tension indicating washer.
Figure 2:
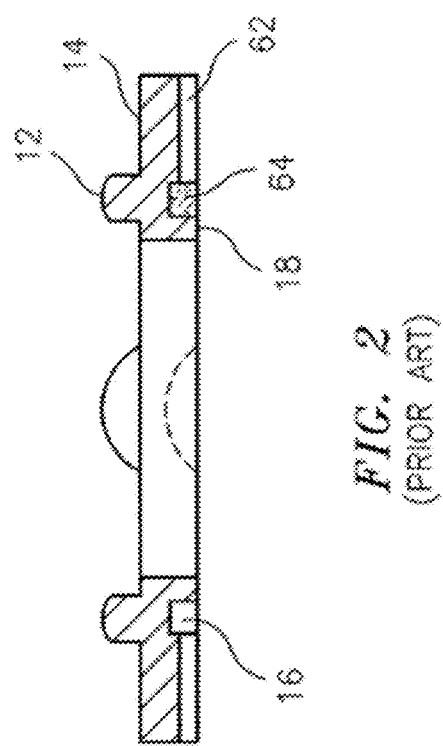
FIG. 2 is a cross-sectional view of the direct tension indicating washer shown in FIG. 1 taken along line 2-2.

Exemplary embodiments are directed to a direct tension indicating apparatus having a direct tension indicating washer and a base washer. In some embodiments, the base washer is a direct tension indicating washer. An anti-rotation feature is used to prevent rotation of the direct tension indicating washer relative to the base washer.

FIGS. 3 and 4 are perspective views of a direct tension indicating washer 100 in an embodiment. The direct tension indicating washer 100 has a planar body with a central opening 102. The direct tension indicating washer 100 includes protuberances 112 formed on a first surface 114 and corresponding indentations 116 formed on a second surface 118. The direct tension indicating washer 100 includes channels 120 in bottom surface 118 that lead from each indentation 116 to the outer diameter of the direct tension indicating washer 100. Each indentation 116 is filled with an indicating material 117. The indicating material 117 may be silicon or other resilient material. When direct tension indicating washer 100 is used with a bolt, protuberances 112 are compressed as the bolt is tensioned. When the desired bolt tension is achieved, indicating material 117 emerges from channel 120 at the outer diameter of direct tension indicating washer 100. The emission of the indicating material 117 provides a visual indicator that the bolt has been properly tensioned.

The direct tension indicating washer 100 may be used with a base washer 130, an example of which is shown in FIGS. 5 and 6. The base washer 130 has a planar body with a central opening 132, which is aligned with central opening 102 when used with direct tension indicating washer 100. The base washer 130 has a first surface 134 and a second surface 136. In use, the first surface 134 faces second surface 118 of the direct tension indicating washer 100. The direct tension indicating washer 100 and the base washer 130 are used together so that the indentations 116 are positioned above the flat, first surface 134 of the base washer 130. The first surface 134 surrounds the indentation 116, and prevents indicating material 117 from traveling in directions other than along channel 120.

The direct tension indicating washer 100 and base washer 130 include an anti-rotation feature to prevent the direct tension indicating washer 100 from rotating relative to the base washer 130. In the embodiment of FIGS. 3-6, the direct tension indicating washer 100 includes two notches 122 and base washer 130 includes two tabs 138. When used together, the tabs 138 are received in the notches 122 to prevent the base washer 130 from rotating relative to the direct tension indicating washer 100 when the nut is tightened. This prevents the indicating from smearing between the base washer 130 and direct tension indicating washer 100. Embodiments are not limited to use of two tabs 138 and two notches 122. One or more tabs 138 may be located on the direct tension indicating washer 100 and one or more notches maybe located on the base washer 130, and vice versa. The tabs 138 and notches 122 are just one example of an anti-rotation feature. In other embodiments, pins and holes are used to prevent the base washer 130 from rotating relative to the direct tension indicating washer 100.

Figure 7:
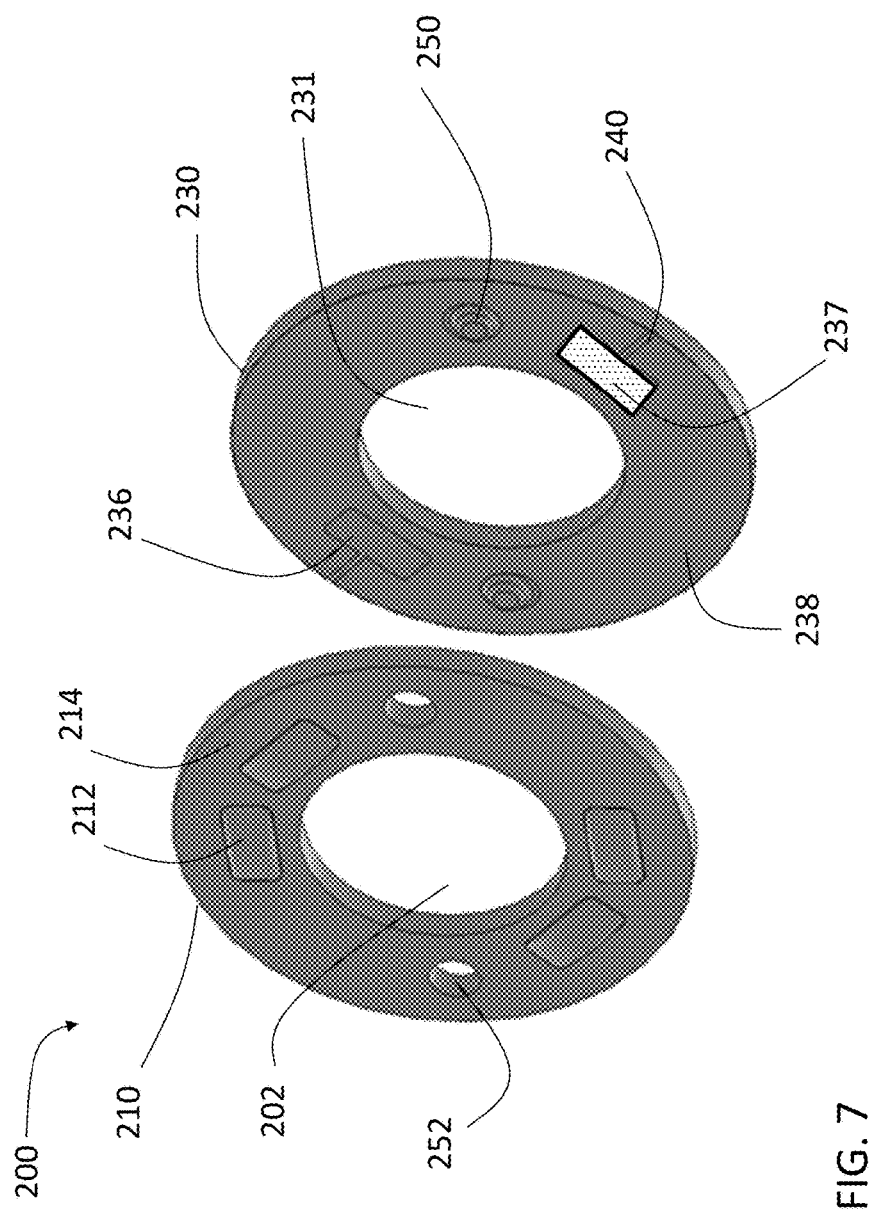
FIGS. 7 and 8 are perspective views of a direct tension indicating apparatus in an embodiment.
Figure 8:
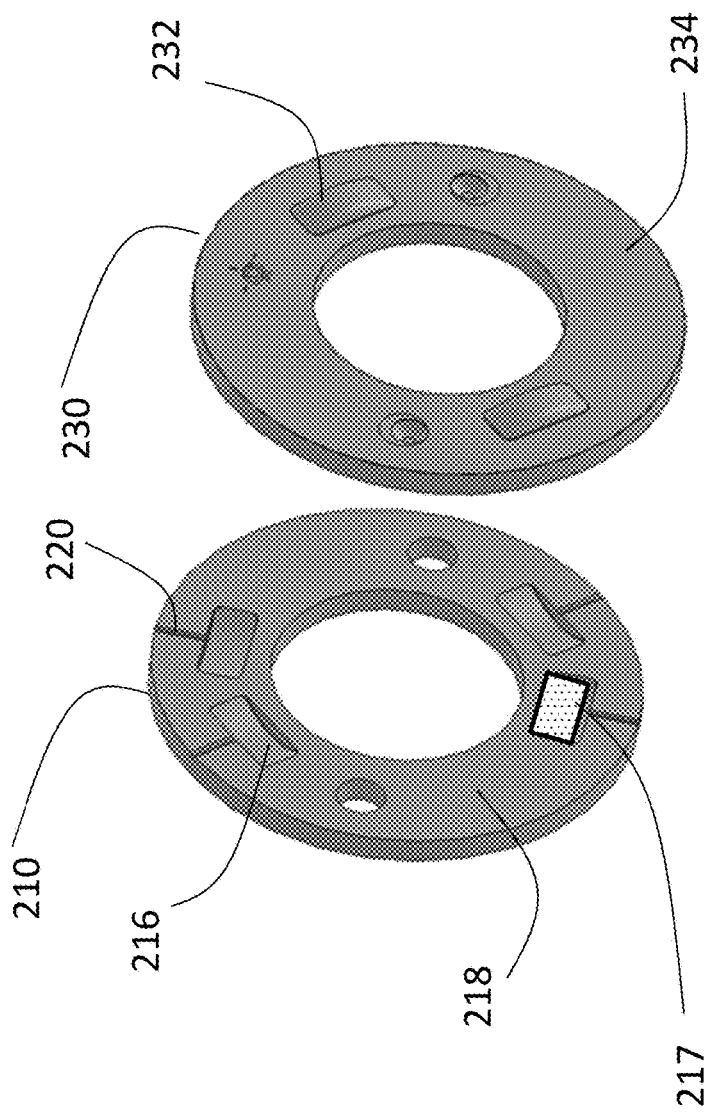

FIGS. 7 and 8 are perspective views of a direct tension indicating apparatus 200 in another embodiment. The direct tension indicating apparatus 200 includes a direct tension indicating washer 210 and a base washer 230. The direct tension indicating washer 210 has a planar body with a central opening 202. The direct tension indicating washer 210 includes protuberances 212 formed on a first surface 214 and corresponding indentations 216 formed on a second surface 218 (FIG. 8). The direct tension indicating washer 210 includes channels 220 in second surface 218 that lead from each indentation 216 to the outer diameter of the direct tension indicating washer 210. Each indentation 216 is filled with an indicating material 217. The indicating material 217 may be silicon or other resilient material. When direct tension indicating washer 210 is used with a bolt, protuberances 112 are compressed as the bolt is tensioned. When the desired bolt tension is achieved, indicating material 217 emerges from channel 220 at the outer diameter of direct tension indicating washer 210. The emission of the indicating material 217 provides a visual indicator that a predetermined bolt tension has been achieved.

In the embodiment of FIGS. 7 and 8, the base washer 230 is also a direct tension indicating washer. The direct tension indicating washer 230 has a planar body with a central opening 231. The direct tension indicating washer 230 includes protuberances 232 formed on a first surface 234 and corresponding indentations 236 formed on a second surface 238 (FIG. 7). The direct tension indicating washer 230 includes channels 240 in second surface 238 that lead from each indentation 236 to the outer diameter of the direct tension indicating washer 230. Each indentation 236 is filled with an indicating material 237. The indicating material 237 may be silicon or other resilient material. When direct tension indicating washer 230 is used with a bolt, protuberances 232 are compressed as the bolt is tensioned. When the desired bolt tension is achieved, indicating material 237 emerges from channel 240 at the outer diameter of direct tension indicating washer 230. The emission of the indicating material 237 provides a visual indicator that the bolt has been properly tensioned.

When used together as a direct tension indicating apparatus, first direct tension indicating washer 210 is placed against the second direct tension indicating washer 230 such that second surface 218 faces second surface 238. The first direct tension indicating washer 210 and the second direct tension indicating washer 230 include an anti-rotation feature in the form of pins 250 on the second surface 238 of the second direct tension indicating washer 230 and openings 252 in the planar body of the first direct tension indicating washer 210. The pins 250 engage openings 252 to prevent the second direct tension indicating washer 230 from rotating relative to the first direct tension indicating washer 210 as the bolt is tensioned. Embodiments are not limited to use of two pins 250 and two openings 252. One or more pins 250 may be located on the direct tension indicating washer 210 and one or more openings 252 may be located on the direct tension indicating washer 230, and vice versa.

The direct tension indicating apparatus 200 of FIGS. 7 and 8 may be used in multiple manners. In a first configuration, the indentations 216 of the first direct tension indicating washer 210 are not aligned with the indentations 236 of the second direct tension indicating washer 230. This arrangement allows for indicating material 217 to be emitted at a first bolt tension and indicating material 237 to be emitted at a second bolt tension. For example, the first direct tension indicating washer 210 may be calibrated to emit the indicating material 217 at the outer diameter at a tension representing 45 ksi bolt stress, while the second direct tension indicating washer 230 may be calibrated to emit the indicating material 237 at the outer diameter at a tension representing 60 ksi bolt stress.

In an alternate configuration, the indentations 216 of the first direct tension indicating washer 210 are aligned with the indentations 236 of the second direct tension indicating washer 230. Aligning the indentations 216 with the indentations 236 results in more indicating material 217 and 237 being emitted at the outer diameter at the predetermined bolt tension, providing a higher visibility squirt event.

Embodiments of the direct tension indicating apparatus provide a number of benefits. First, it prevents any relative rotation direct tension indicating washer with the surface immediately under it, thereby eliminating the potential for smearing of the squirt event around the outer diameter if the turned element induces rotation of the direct tension indicating washer. Second, it eliminates the unknown surface condition of the components being clamped together from negatively impacting the squirt performance. Examples of this detrimental condition would be rough coatings or previous bolting efforts applied to the surfaces which caused galling. If there is significant roughness to the surface or surface irregularities the indicating material does not properly direct to the outer edge of the part and may find rough voids to fill instead. Finally, it allows direct tension indicating washer to span an irregular hole condition. For example, if a hole has a significant taper, chamfer, rough edges, or sizing that would otherwise cause the squirt mechanism to progress inwards compared to outwards; the base washer allows the direct tension indicating washer to work in spite of these phenomena.

While exemplary embodiments have been shown and described, various modifications and substitutions may be made thereto without departing from the spirit and scope of the invention. Accordingly, it is to be understood that the present invention has been described by way of illustration and not limitation.

What is claimed is:

1. A direct tension indicating washer apparatus comprising:
    a planar direct tension indicating washer;
    a planar base washer; and
    an anti-rotation feature to prevent rotation of the direct tension indicating washer relative to the base washer;
    wherein the direct tension indicating washer comprises:
        a first surface having a protuberance formed thereon;
        a second surface having an indentation formed opposite the protuberance;
        an indicating material positioned in the indentation; and
        a channel leading from the indentation to an outer diameter of the direct tension indicating washer.

2. A direct tension indicating washer apparatus comprising:
    a planar direct tension indicating washer;
    a planar base washer; and
    an anti-rotation feature to prevent rotation of the direct tension indicating washer relative to the base washer.

3. The direct tension indicating washer apparatus of claim 2, wherein:
    the anti-rotation feature comprises a tab on one of the direct tension indicating washer and the base washer and a notch on the other of the direct tension indicating washer and the base washer, the tab received in the notch to prevent rotation of the direct tension indicating washer relative to the base washer.

4. The direct tension indicating washer apparatus of claim 2, wherein:
    the anti-rotation feature comprises two tabs on one of the direct tension indicating washer and the base washer and two notches on the other of the direct tension indicating washer and the base washer, the tabs received in the notches to prevent rotation of the direct tension indicating washer relative to the base washer.

5. The direct tension indicating washer apparatus of claim 2, wherein:
    the anti-rotation feature comprises a pin on one of the direct tension indicating washer and the base washer and an opening on the other of the direct tension indicating washer and the base washer, the pin received in the opening to prevent rotation of the direct tension indicating washer relative to the base washer.

6. The direct tension indicating washer apparatus of claim 2, wherein:
    the anti-rotation feature comprises two pins on one of the direct tension indicating washer and the base washer and two openings on the other of the direct tension indicating washer and the base washer, the pins received in the openings to prevent rotation of the direct tension indicating washer relative to the base washer.

7. The direct tension indicating washer apparatus of claim 2, wherein:
    the base washer is a second direct tension indicating washer.

8. The direct tension indicating washer apparatus of claim 7, wherein:
    the second direct tension indicating washer comprises:
        a first surface having a protuberance formed thereon;
        a second surface having an indentation formed opposite the protuberance;
        an indicating material positioned in the indentation; and
        a channel leading from the indentation to an outer diameter of the direct tension indicating washer.

9. The direct tension indicating washer apparatus of claim 8, wherein:
    the second surface of the direct tension indicating washer is positioned adjacent to and facing the second surface of the second direct tension indicating washer.

10. The direct tension indicating washer apparatus of claim 8, wherein:
    the indentation of the direct tension indicating washer is aligned with the indentation of the second direct tension indicating washer.

11. The direct tension indicating washer apparatus of claim 8, wherein:
    the direct tension indicating washer is calibrated for a first bolt tension and the second direct tension indicating washer is calibrated for a second bolt tension.

12. The direct tension indicating washer apparatus of claim 11, wherein:
    the first bolt tension is different than the second bolt tension.

* * * * *